United States Patent [19]
Wiest

[11] Patent Number: 5,852,598
[45] Date of Patent: Dec. 22, 1998

[54] DISK-SHAPED SOUND RECORDING MEDIUM, ESPECIALLY CD

[76] Inventor: Peter P. Wiest, Hessenallee 8, 14052, Berlin, Germany

[21] Appl. No.: 770,182

[22] Filed: Dec. 19, 1996

[30] Foreign Application Priority Data

Dec. 19, 1995 [DE] Germany .................. 295 20 805.8

[51] Int. Cl.[6] ...................................... G11B 3/70
[52] U.S. Cl. ........................... 369/272; 369/291
[58] Field of Search .................. 369/34, 36, 37, 369/38, 191, 192, 178, 291, 272

[56] References Cited

U.S. PATENT DOCUMENTS 5,251,192 10/1993 Liu ............................................. 369/36
5,253,235 10/1993 Isobe et al. .............................. 369/191
5,422,869 6/1995 Versleegers ................................ 369/37
5,528,567 6/1996 Kim ............................................ 369/36

Primary Examiner—Allen T. Cao
Attorney, Agent, or Firm—McGlew and Tuttle

[57] ABSTRACT

A disk-shaped sound recording medium includes a disk element with shaped outer contour with at least two contour areas which are shaped mutually complementarily to one another. At least two sound recording media can put together in the plane of the disk in the manner of a jigsaw puzzle. One of the contour areas is made curved-shaped with the disk radius (R) in the inward direction and, approximately in a center of this one of the contour areas, with an outwardly directed, undercut tongue. Another of the contour areas is provided with a groove, which is formed in a circular outer contour. The groove is shaped complementary to the tongue.

19 Claims, 3 Drawing Sheets

DISK-SHAPED SOUND RECORDING MEDIUM, ESPECIALLY CD

FIELD OF THE INVENTION

The present invention pertains to a disk-shaped sound recording medium, especially CD, with shaped outer contour.

BACKGROUND OF THE INVENTION

Disk-shaped CDs with shaped outer contour have been known from DE Utility Model M 95 02 679. The outer contours are heart-shaped, triangular, sawtooth-like, star-shaped, or have any other desired, irregular shape. It is disadvantageous here that the information content of the shaped CD is reduced by the shaping of the outer contour, because only the remaining circular area around the center can be used for recording information. The information content intended for a CD with nonshaped outer contour must therefore be divided, e.g., between two CDs. It is disadvantageous here that the two CDs that are now required must be accommodated in different cassettes or in a double cassette.

SUMMARY AND OBJECTS OF THE PRESENT INVENTION

The object of the present invention is therefore to provide disk-shaped sound recording media, (e.g. a disk with a data region) especially CDs, with shaped outer contour, which can easily be combined with one another.

To accomplish this object, the present invention provides for the outer contour having at least two contour areas shaped mutually complementarily to one another such that at least two sound recording media can be put together in the plane of the disk in the manner of a jigsaw puzzle. As a result, the information content distributed, e.g., on two disk-shaped sound recording media, especially CDs, with shaped outer contour, can be easily combined with the two sound recording media, especially CDs, because these can be put together in the plane of the disk in the manner of a jigsaw puzzle. Even though the two sound recording media, especially CDs, may also be accommodated in separate cassettes or in one double cassette, the combination of the information content arises from the possibility of putting together the two sound recording media, especially CDs, in the manner of a jigsaw puzzle in the plane of the disk. However, there is additionally a possibility of storing the two sound recording media, especially CDs, together in one storage means, wherein the sound recording media, especially CDs, put together in the manner of a jigsaw puzzle, can be stored together in one plane, namely, the plane of the disk.

One contour area is curved in the preferred embodiment, with the radius of the disk shaped in the inward direction and, approximately centrally, with an outwardly directed, undercut tongue, and the other contour area is provided with a groove, which is shaped into the constantly circular outer contour and is complementary to the tongue. As a result, the two sound recording media, especially CDs, can be nondetachably connected to one another in the plane of the disk in the manner of a jigsaw puzzle due to the mutual engagement of the groove and tongue. To separate one sound recording medium from the other, a movement at right angles to the plane of the disk is necessary, as a result of which the tongue of one sound recording medium is snapped out of the groove of the other sound recording medium.

Finally, the two, mutually complementarily shaped curved areas are arranged at right angles to one another, and the opposite edges of the outer contour are shaped straight by mutually perpendicular secants. As a result, it is possible to connect four disk-shaped sound recording media, especially CDs, with shaped outer contours and tongue-and-groove contour areas according to the present invention in the plane of the disk in the manner of a jigsaw puzzle and to also store them in this arrangement in a cassette (a disk case), wherein the outer contour of the four disk-shaped sound recording media, especially CDs, forms a square.

The present invention will be explained in greater detail below on the basis of two exemplary embodiments of disk-shaped CDs with shaped outer contour, which are shown in greater detail in the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
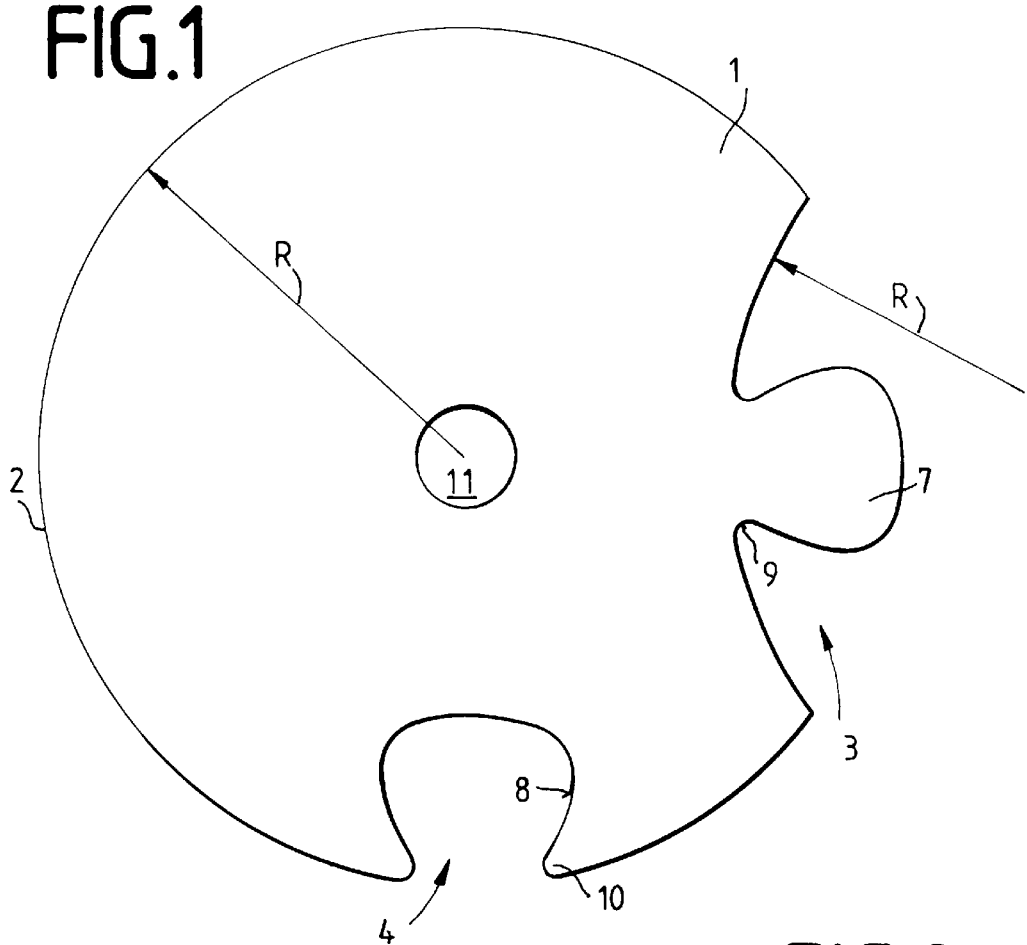
FIG. 1 is the top view of a first exemplary embodiment of a single CD.
Figure 2:
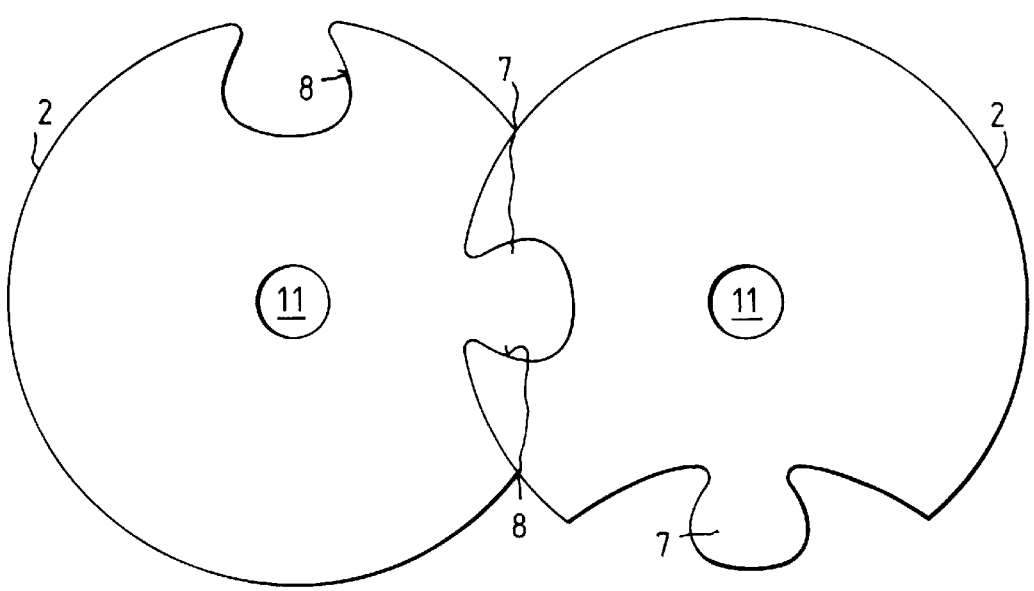
FIG. 2 is the top view of two CDs according to FIG. 1, which are connected to one another.

In the first exemplary embodiment according to FIG. 1, the disk-shaped sound recording medium (e.g. with a data region) in the form of a CD 1 is provided with two contour areas 3, 4, which are at right angles to one another and are formed by means of, e.g., cutting or milling tools or by means of laser. The contour area 2 shaped over more than half the circumference in a circular shape with the disk radius R has the two contour areas 3, 4, which are at right angles to one another and are shaped complementarily to one another such that at least two CDs can be put together in the manner of a jigsaw puzzle in the plane of the disk, as is shown in FIG. 2. One contour area 3 is shaped for this purpose as a curved contour area with the disk radius R in the inward direction and approximately centrally with an outwardly directed, undercut and crowned tongue 7, and the other contour area 4 is shaped with a crowned groove 8, which is made in the circular outer contour having the radius R and is complementary to the tongue 7. The two, mutually complementarily shaped contour areas 3, 4 are at right angles to one another in coordinate axes passing through the center 11. The head-shaped tongue 7 of the contour area 3 with its undercuts 9 is rounded on all sides and does not project beyond the outer contour of radius R of the CD 1. The correspondingly negative shape of the groove 8 shaped complementarily to the tongue 7 has two neck areas 10, which correspond to the undercuts 9 of the tongue 7. The contour area 2 of the outer contour is circular with the radius R.

As is shown in FIG. 2, two CDs shaped according to FIG. 1 can be put together by means of the mutually engaging tongues 7 and grooves 8 such that their outer, circular contour areas 2 form an elongated oval. In this form, the two CDs 1 can be accommodated together in a cassette (a disk case), not specifically shown. As a result, the information content of the two individual CDs 1, which is applied to the circular core areas of the two CDs 1, can be put together in terms of storage in one common cassette due to joint accommodation of the two CDs 1.

Figure 3:
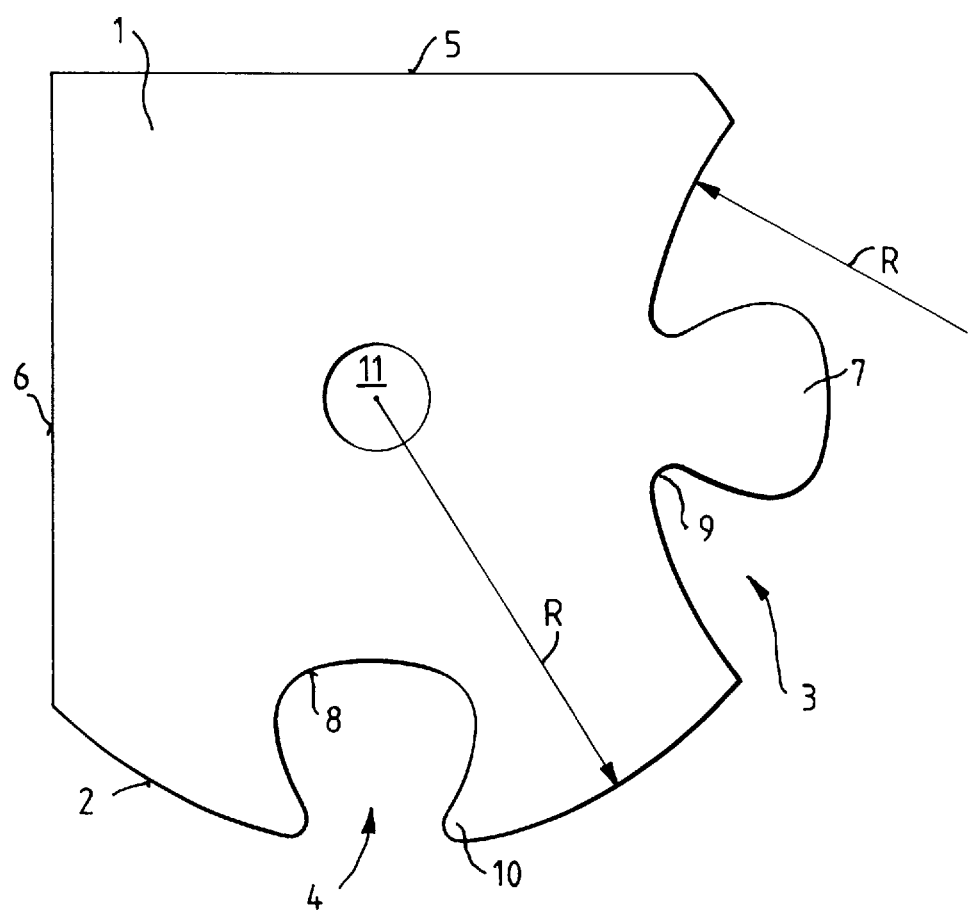
FIG. 3 is the top view of a second exemplary embodiment of a single CD.

In the second embodiment according to FIG. 3, the disk-shaped sound recording medium (e.g. with a machine readable data area) in the form of a CD 1 is provided with four contour areas 3, 4, 5 and 6 directed at right angles to one another in coordinate axes passing through the center 11, wherein the shaped outer contours are prepared by means of suitable processing tools, such as cutting or milling tools or by means of laser. The outer contour also has the two contour areas 3, 4, which are shaped mutually complementarily to one another such that at least two CDs 1 can be put together in the plane of the disk in the manner of a jigsaw puzzle. One contour area 3 is designed for this purpose curve-shaped with the disk radius R in the inward direction and, approximately in the center, with an outwardly directed, undercut tongue 7, and the other contour area 4 is shaped with a groove 8, which is complementary to the tongue 7 and is made in the circular outer contour having the radius R. The two, mutually complementarily shaped contour areas 3, 4 are at right angles to one another in coordinate axes passing through the center 11. The head-shaped tongue 7 of the contour area 3 with its undercuts 9 is rounded on all sides and it does not project beyond the outer contour of radius R of the CD 1. The correspondingly negative shape of the groove 8, which is complementary to the tongue 7, has two neck areas 10, which correspond to the undercuts 9 of the tongue 7. The contour areas 5, 6 of the outer contour, which are located opposite the tongue 7 and the groove 8, are shaped straight by secants extending at right angles to one another.

Figure 4:
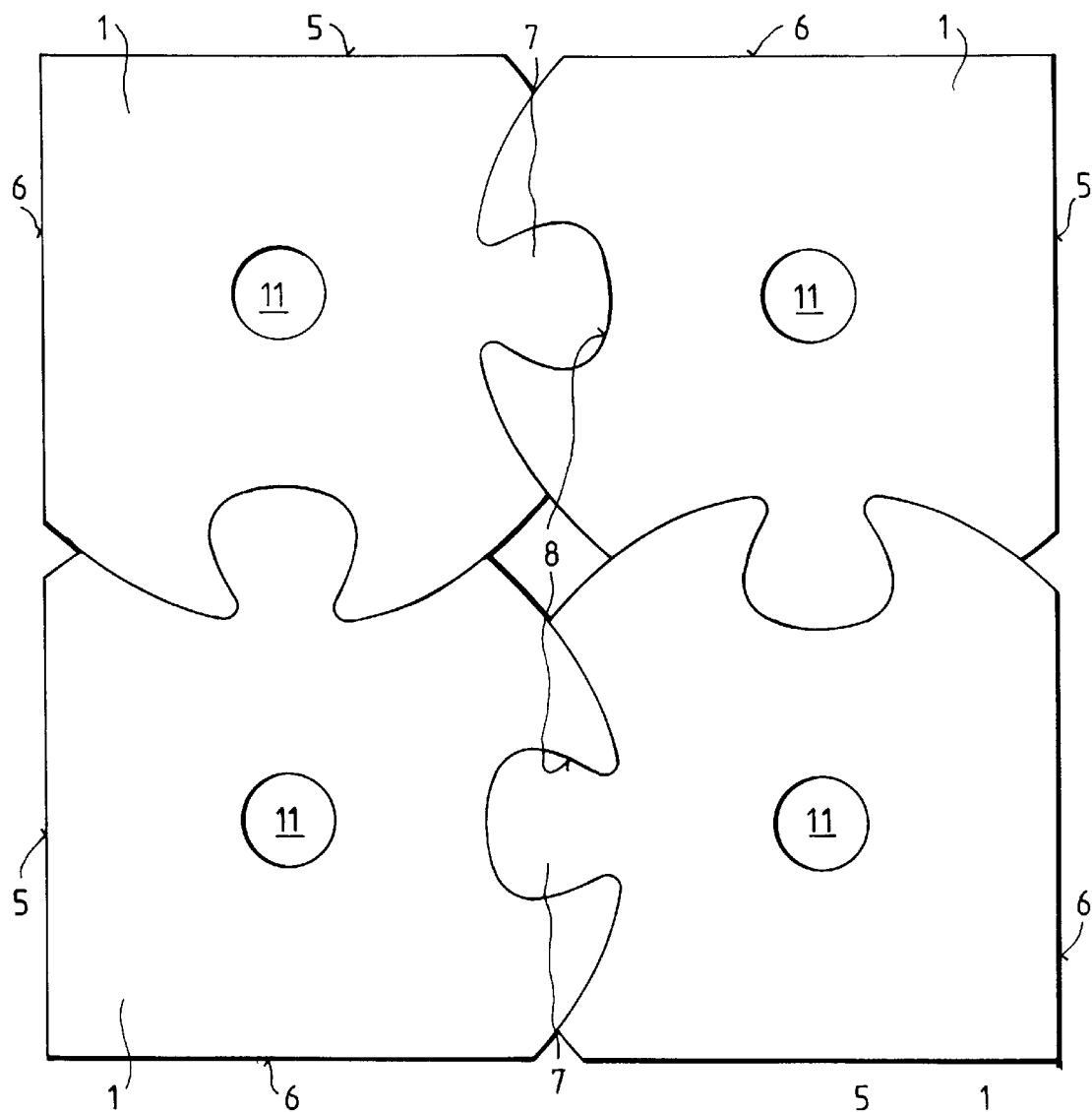
FIG. 4 is the top view of four CDs according to FIG. 3, which are connected to one another.

As is shown in FIG. 4, four CDs 1 shaped according to FIG. 3 can be put together by means of the mutually engaging tongues 7 and grooves 8 such that their outer contour areas 5 and 6 form a square. In this form, the four CDs 1 can be accommodated together in a cassette (a disk case), not shown. As a result, the information content (the information stored in each data region) of the four individual CDs 1, which is applied to the circular core area of the four CDs 1, can be put together in terms of storage by accommodating the four CDs 1 together in a common cassette.

While a specific embodiment of the invention has been shown and described in detail to illustrate the application of the principles of the invention, it will be understood that the invention may be embodied otherwise without departing from such principles.

What is claimed is:

1. A disk-shaped sound recording medium, comprising:
    a disk element with a center and a circular core data storage area, said disk element being provided with a shaped outer contour with a first contour area and a second contour area, said first contour area and said second contour area being shaped mutually complementarily to one another whereby at least two sound recording media are placed together in the plane of the disk in the manner of a jigsaw puzzle.

2. A disk-shaped sound recording medium in accordance with claim 1, wherein said first contour area is made curved-shaped with a disk radius (R) extending in an inward direction approximately in a center of said first contour areas and with an undercut tongue extending outwardly, and said second contour areas is provided with a groove, which is formed in a circular outer contour, said groove being complementary to said tongue.

3. A disk-shaped sound recording medium in accordance with claim 2, wherein said two, mutually complementarily shaped contour areas are at right angles to one another.

4. A disk-shaped sound recording medium in accordance with claim 2, further comprising opposite contour areas including one opposite contour area substantially opposite said first contour area and another opposite contour area substantially opposite said second contour area, said opposite contour areas having a straight edge directed at right angles to one another.

5. A disk-shaped sound recording medium, comprising:
    a disk element with a center and a circular core data storage area surrounding said center and with a shaped outer contour with a first contour area with a shape and having a second contour area with a shape, said second contour area being mutually complementarily to said first contour area whereby said disk element is engagable with another disk element having one of said first contour area and said second contour area for engaging complementary areas of the disk element and the another disk element in a plane of the disk element, the engagement being in the manner of a jigsaw puzzle.

6. A disk-shaped sound recording medium in accordance with claim 5, wherein one of said contour areas is made curved-shaped with the disk radius (R) in the inward direction and, approximately in a center of said one of said contour areas, with an outwardly directed, undercut tongue, and another of said contour areas is provided with a groove, which is formed in a circular outer contour, said groove being complementary to said tongue.

7. A disk-shaped sound recording medium in accordance with claim 6, wherein said two, mutually complementarily shaped contour areas are at right angles to one another.

8. A disk-shaped sound recording medium in accordance with claim 6, further comprising opposite contour areas including one opposite contour area substantially opposite said one of said contour areas and another opposite contour area substantially opposite said another of said contour areas, said opposite contour areas having an outer contour shaped straight by secants directed at right angles to one another.

9. A pair of data disks comprising:
    a first data disk element with a center and a circular core data storage area with a shaped outer contour with a first contour area;
    a second data disk element with a center and a circular core data storage area with a shaped outer contour with a first contour area, said first contour area of said first data disk element and said first contour area of said second data disk element being shaped mutually complementarily to one another with said first data disk element first contour area protruding relative to a complementary recess of said second data disk element first contour area, said first data disk element and said second data disk element being placed together in the plane of the first data disk element with said first contour area of said first data disk element engaged with said complementary first contour area of said second data disk element.

10. The disks in accordance with claim 9, wherein said first contour area of said first data disk element is made curved-shaped with a disk radius (R) extending in an inward direction approximately in a center of said first contour areas and with an undercut tongue extending outwardly, and said first contour area of said second data disk element is provided with a groove, which is formed in a circular outer contour, said groove being complementary to said tongue.

11. The disks in accordance with claim 10, wherein said first data disk element has a second contour area with a shape, said second contour area being mutually complementarily to said first data disk element first contour.

12. The disks in accordance with claim 11, wherein said first data disk element first contour is at right angles to said first data disk element second contour.

13. A disk shaped sound recording medium in accordance with claim 11, further comprising opposite contour areas including one opposite contour area substantially opposite said first data disk element first contour area and another opposite contour area substantially opposite said first data disk element second contour area, said opposite contour areas having a straight edge directed at right angles to one another.

14. The disks in accordance with claim 9, wherein said first data disk element has a second contour area with a shape, said second contour area being mutually complementarily to said first data disk element first contour.

15. The disks in accordance with claim 14, wherein said first data disk element first contour is at right angles to said first data disk element second contour.

16. A disk-shaped sound recording medium in accordance with claim 15, further comprising opposite contour areas including one opposite contour area substantially opposite said first data disk element first contour area and another opposite contour area substantially opposite said first data disk element second contour area, said opposite contour areas having a straight edge directed at right angles to one another.

17. The disks in accordance with claim 10, wherein said second data disk element has a second contour area with a shape, said second contour area being mutually complementarily to said second data disk element first contour.

18. The disks in accordance with claim 17, wherein said second data disk element first contour is at right angles to said second data disk element second contour.

19. A disk-shaped sound recording medium in accordance with claim 17, further comprising opposite contour areas including one opposite contour area substantially opposite said second data disk element second contour area and another opposite contour area substantially opposite said second data disk element second contour area, said opposite contour areas having a straight edge directed at right angles to one another.

* * * * *